United States Patent
Mohaupt et al.

(10) Patent No.: US 6,714,025 B2
(45) Date of Patent: Mar. 30, 2004

(54) METHOD AND APPARATUS FOR SYNCHRONOUS DEMODULATION OF MULTIPLY MODULATED SIGNALS

(75) Inventors: Jens Mohaupt, Pliezhausen (DE); Wolfram Bauer, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 10/079,765

(22) Filed: Feb. 19, 2002

(65) Prior Publication Data
US 2002/0125940 A1 Sep. 12, 2002

(30) Foreign Application Priority Data
Feb. 17, 2001 (DE) .......................... 101 07 547

(51) Int. Cl.[7] .......................... G01R 27/26; H03D 3/00; G01P 15/08
(52) U.S. Cl. .......................... 324/681; 324/682; 329/315; 73/504.03
(58) Field of Search .......................... 324/681, 682, 324/686; 329/315; 73/504.02, 504.03

(56) References Cited

U.S. PATENT DOCUMENTS

| | | | | |
|---|---|---|---|---|
| 4,833,417 A | * | 5/1989 | Schroeder | .................. 329/358 |
| 5,260,671 A | * | 11/1993 | Iso et al. | .................. 329/302 |
| 5,672,949 A | * | 9/1997 | Ward | .................. 73/504.16 |
| 5,859,368 A | * | 1/1999 | Cargille | .................. 73/504.15 |
| 6,062,082 A | * | 5/2000 | Guenther et al. | .................. 73/504.03 |
| 6,445,195 B1 | * | 9/2002 | Ward | .................. 324/684 |

* cited by examiner

Primary Examiner—N. Le
Assistant Examiner—Timothy J. Dole
(74) Attorney, Agent, or Firm—Kenyon & Kenyon

(57) ABSTRACT

A method and an apparatus for synchronous demodulation of the multiply modulated rotation rate signal of a rotation rate sensor which comprises a spring-mass system that oscillates at its natural resonant frequency, and at least one capacitor for ascertaining a Coriolis effect acting on the spring-mass system or a rotation rate, the rotation rate being ascertained by a time-variable capacitance change, brought about by the rotation rate, of the at least one capacitor by multiple demodulation of a multiply modulated electrical signal that comprises a time-variable first electrical signal and a second electrical signal, overlaid thereon, at the natural resonant frequency of the rotation rate sensor, the amplitude of the second electrical signal of the time-variable capacitance change of the at least one capacitor being correspondingly modulated. To substantially reduce the outlay for synchronous demodulation, the first electrical signal is generated so that it exhibits a time-invariant phase relationship to the natural resonant frequency of the rotation rate sensor.

24 Claims, 2 Drawing Sheets

METHOD AND APPARATUS FOR SYNCHRONOUS DEMODULATION OF MULTIPLY MODULATED SIGNALS

FIELD OF THE INVENTION

The present invention relates to a method and an apparatus for synchronous demodulation of multiply modulated signals.

BACKGROUND INFORMATION

An electromechanical rotation rate sensor, for example a micromechanical rotation rate sensor, constitutes a spring-mass system in which the Coriolis effect may be used to measure the rotation rate of the sensor. Upon rotation of the sensor or the system, the masses of the system are deflected and the deflection may be ascertained capacitatively in order to determine the rotation rate. While the rotation rate sensor is in operation, the spring-mass system of the rotation rate sensor oscillates at its natural resonant frequency $f_z$. Absent the effect of an external rotation rate, the capacitance of so-called sensing capacitances provided in the rotation rate sensor does not change. If the spring-mass system is deflected "out-of-plane" in the context of a rotation of the sensor, the capacitance changes at the natural resonant frequency $f_z$. The amplitude of this oscillation is an indication of the external rotation rate presently acting on the rotation rate sensor.

The deflection of the spring-mass system during its rotation as a result of the Coriolis effect may be sensed, by way of a capacitance change associated therewith in capacitances provided in the rotation rate sensor, by way of a capacitance/voltage (C/U) conversion.

When capacitance changes occur as a result of the rotation of the sensor, those changes may bring about voltage jumps at the input of the charge amplifier. The output signal $U_{out}$ of the charge amplifier is proportional to the quotient of the useful capacitance $C_{NUTZ}$ and feedback capacitance $C_{RK}$ of the sensor in question, multiplied by the amplitude of the high-frequency voltage jump $U_{HF}$, that is:

$$U_{OUT}=(C_{NUTZ}/C_{RK})*U_{HF}.$$

To ensure that signal processing of the output signal $U_{OUT}$ of the charge amplifier can occur in phase with the natural resonant frequency $f_z$ of the spring-mass system, a phase-locked loop (PLL) that synchronizes itself to the natural resonant frequency $f_z$ of the spring-mass system may be used. The sampling frequency for analyzing capacitance changes by the switched capacitor technology may be referred to as $f_a$, and the modulation frequency, or frequency of the high-frequency voltage jump $U_{HF}$, may be referred to as $f_{HF}$.

To achieve a greater signal-to-noise ratio than would be possible in the baseband, the voltage jumps that are brought about by the capacitance changes may be alternated as to sign. The baseband is thereby transformed to half the sampling frequency $f_a$, that is, to the frequency $f_{HF}$ of the voltage jump $U_{HF}$; thus $f_{HF}=f_a/2$. In same analysis devices, the natural resonant frequency $f_z$ of the rotation rate sensor may be used as the intermediate frequency. In a first demodulation step in synchronous demodulation, the raw signal is multiplied by the frequency $f_{HF}$ of the voltage jump $U_{HF}$. In a second demodulation step of synchronous demodulation, the rotation rate signal of the rotation rate sensor is then convoluted into the baseband. In a subsequent filtration step, the high-frequency convolution products are suppressed and the output signal of the filtration step or of a corresponding filter stage is limited to the desired bandwidth.

SUMMARY OF THE INVENTION

For cost reasons, according to one exemplary embodiment and/or exemplary method of the present invention, a charge amplifier of so-called switched capacitor technology may be used as the C/U converter.

According to an exemplary embodiment and/or exemplary method of the present invention the high-frequency signals of frequency $f_{HF}$, which may serve for analysis of the capacitance change resulting from the Coriolis effect upon rotation of the rotation rate sensor, may be configured by way of a PLL as a multiple of the signal, of natural resonant frequency $f_z$, of the spring-mass system of the rotation rate sensor. A fixed dependence between the phase position of the signals and frequencies $f_{HF}$ and $f_z$ may thereby obtained. As a result of a logical association between these two signals, signals for controlling a synchronous demodulator may be generated. This may be done with the exemplary circuit according to the present invention depicted in FIG. 1. This circuit may create an in-phase multiplication of the two frequencies $f_{HF}$ and $f_z$ and may effect a synchronous demodulation that transforms the rotation rate signal to be sensed, or the rotation rate signal of the rotation rate sensor, into the baseband.

An exemplary embodiment and/or exemplary method of the present invention is directed to providing a method for synchronous demodulation of the multiply modulated rotation rate signal of a rotation rate sensor which includes a spring-mass system that oscillates at its natural resonant frequency ($f_z$), and at least one capacitor for ascertaining a Coriolis effect acting on the spring-mass system; i.e. a rotation rate, the rotation rate being ascertained by a time-variable capacitance change, brought about by the rotation rate, of the at least one capacitor by multiple demodulation of a multiply modulated electrical signal that includes a time-variable first electrical signal ($f_{HF}$) and a second electrical signal, superimposed thereon, at the natural resonant frequency ($f_z$) of the rotation rate sensor, the amplitude of the second electrical signal of the time-variable capacitance change of the at least one capacitor being correspondingly modulated, wherein the first electrical signal ($f_{HF}$) is generated in such a way that it exhibits a time-invariant phase relationship to the natural resonant frequency ($f_z$) of the rotation rate sensor.

The following components may be used to provide an exemplary embodiment and/or exemplary method according to the present invention: a rotation rate sensor, a PLL, a logic circuit, and a synchronous demodulator, as depicted, for example, in FIG. 1. Several demodulation sections with mixers, filters, and optionally also intermediate amplifiers may be necessary.

According to one exemplary embodiment and/or exemplary method of the present invention, the outlay for synchronous demodulation may be almost halved.

DETAILED DESCRIPTION

Figure 1:
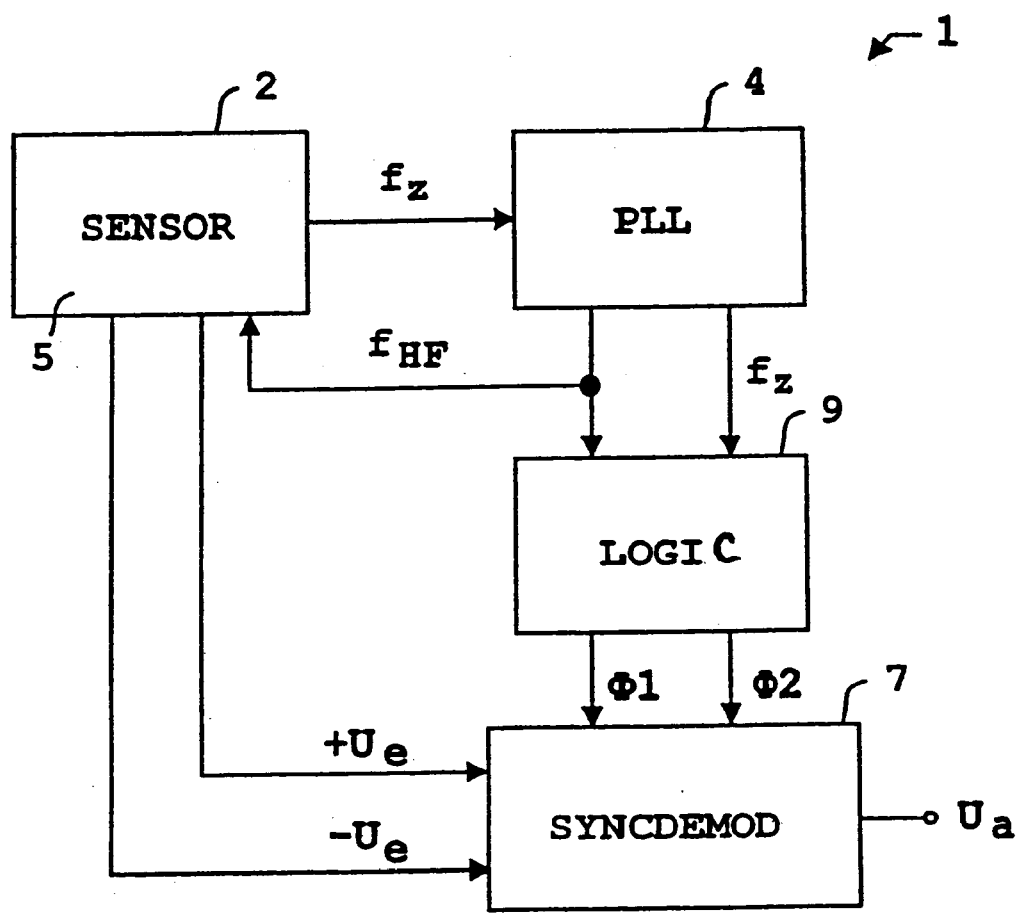
FIG. 1 shows a block diagram of components of an exemplary embodiment of a synchronous demodulation apparatus according to the present invention for demodulating the multiply modulated signals delivered by a known rotation rate sensor.

FIG. 1 depicts, in the form of a block diagram, an exemplary embodiment of a synchronous demodulation apparatus 1 according to the present invention for determining the external rotation rate of a sensor or rotation rate sensor 2 on the basis of the multiply modulated signals delivered by the sensor. For the sake of clarity, the block diagram emphasizes certain of the components of apparatus 1 in connection with explaining the exemplary embodiment of the present invention.

The spring-mass system of rotation rate sensor 2 oscillates at its natural resonant frequency as a result of a signal conveyed to rotation rate sensor 2. If the spring-mass system or rotation rate sensor 2 is deflected because of a rotation of rotation rate sensor 2, this may be sensed in the so-called sensing capacitances (not depicted) provided in rotation rate sensor 2. The amplitude of the signal, at natural resonant frequency $f_z$, delivered by the capacitances is modulated. The amplitude modulation may be an indication of the external rotation rate acting on rotation rate sensor 2, or of the Coriolis effect acting on the spring-mass system as a consequence of a rotation of the spring-mass system and an out-of-plane deflection, associated therewith, of the spring-mass system. From the drive circuit (not depicted) of rotation rate sensor 2, a signal at natural resonant frequency $f_z$ may be conveyed to a phase-locked loop or PLL 4. PLL 4 synchronizes itself to natural resonant frequency $f_z$ and generates a modulation signal at a frequency $f_{HF}$. Frequency $f_{HF}$ is a multiple of natural resonant frequency $f_z$, in particular an integral multiple. In sensor 2, the rotation rate signal modulated with natural resonant frequency $f_z$ is modulated with modulation frequency $f_{HF}$. This doubly modulated signal reproduces the capacitance changes resulting from the action of an external rotation rate on rotation rate sensor 2.

Figure 3:
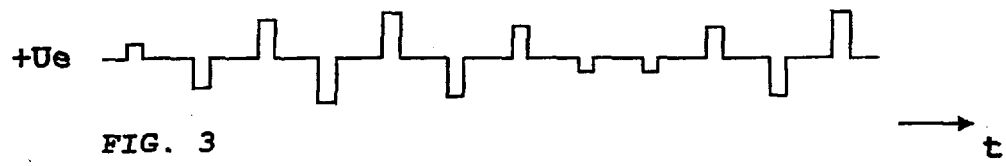
FIG. 3 shows an input signal $+U_e$ of the synchronous demodulator of FIG. 2.
Figure 4:
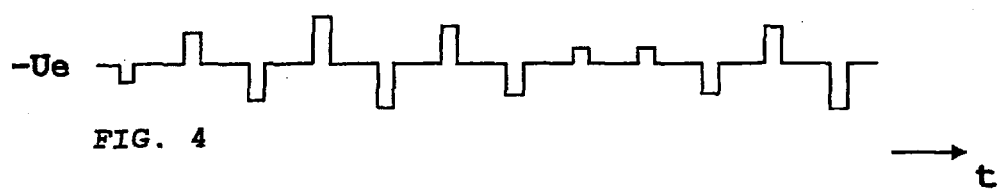
FIG. 4 shows an inverted input signal $-U_e$ of FIG. 3 of the synchronous demodulator of FIG. 2.

The doubly modulated signal may be converted, by a C/U converter 5 (not explicitly depicted) in the form of a charge amplifier using switched capacitor technology, into mutually inverse voltage signals $+U_e$ and $-U_e$ (see FIGS. 3 and 4). The doubly modulated signal may thereby be sampled at a sampling frequency $f_a$ that is twice as high as the modulation or carrier frequency $f_{HF}$. This may be done to achieve a higher signal-to-noise ratio than would be possible in the baseband.

The mutually inverse signals $+U_e$ and $-U_e$ may be present in temporally discrete fashion at the input of synchronous demodulator 7, as is evident from FIGS. 1, 3, and 4. For the sake of clarity, in FIGS. 3 and 4 frequency $f_{HF}$ of the modulation or carrier signal made available by the PLL is simply chosen to be four times the natural resonant frequency $f_z$ of the sensor. The rotation rate signal modulated with the natural resonant frequency of the sensor may be apparent in FIGS. 3 and 4 as an envelope of the pulses. Its amplitude is proportional to the instantaneous external rotation rate.

Figure 5:
FIG. 5 shows a first control signal $\phi 1$ for switching on or off two first switches of the synchronous demodulator of FIG. 2.
Figure 6:
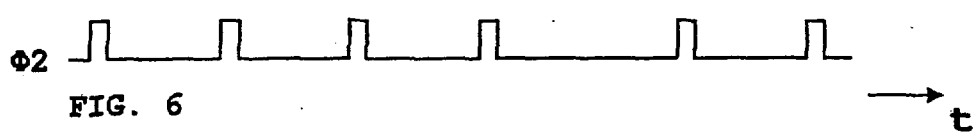
FIG. 6 shows a second control signal Φ2 for switching on or off two second switches of the synchronous demodulator of FIG. 2.

PLL 4 conveys to logic circuit 9 the modulation frequency $f_{HF}$ and the amplitude-modulated natural resonant frequency $f_z$ picked off from the capacitances of rotation rate sensor 2. The logic circuit 9 generates the control signals Φ1 and Φ2 depicted in FIGS. 5 and 6. A comparison of FIGS. 4 and 5 shows that control signal Φ1 always has a high voltage level (i.e. is a switch-on signal for one of the electronic switches described below) when voltage signal $-U_e$ assumes a positive value. A comparison of FIGS. 3 and 6 also shows that control signal Φ2 is always at a high voltage level (i.e. is a switch-on signal for an electronic switch) when voltage signal $+U_e$ assumes a positive value. A zero level of control signals Φ1 and Φ2 constitutes a switch-off signal for the electronic switches described below.

Figure 2:
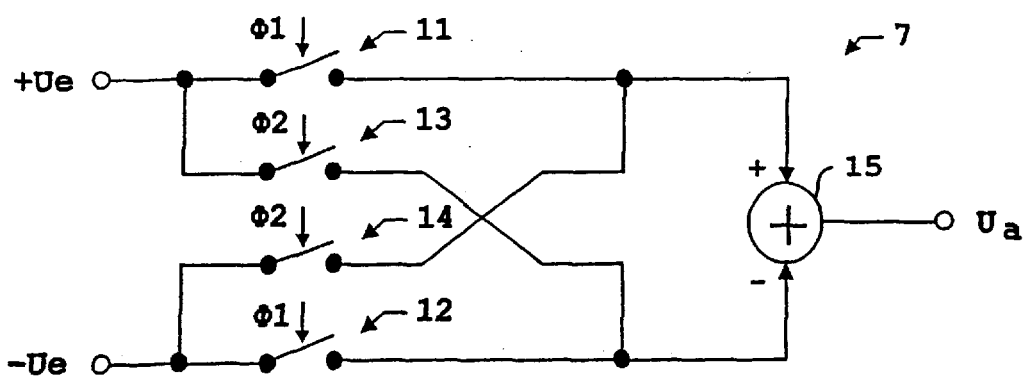
FIG. 2 shows an exemplary embodiment of a synchronous demodulator of the synchronous demodulator apparatus of FIG. 1.

FIG. 2 shows synchronous demodulator 7 of FIG. 1 in further detail. Synchronous demodulator 7 includes electronic switches 11, 12, 13, and 14, and a summer 15. The input of synchronous demodulator 7 acted upon by voltage signal $+U_e$ is connected to the inputs of switches 11 and 13. The input acted upon by voltage signal $-U_e$ (which is the inverse of voltage signal $+U_e$) is connected to the inputs of switches 12 and 14. The output of switch 11 is connected to the output of switch 14 and to a first input of summer 15. The output of switch 13 is connected to the output of switch 12 and to the second input of summer 15. Switches 11 and 12 may be opened or closed by control signal Φ1, and switches 13 and 14 by control signal Φ2, in the manner shown in FIGS. 5 and 6.

Figure 7:
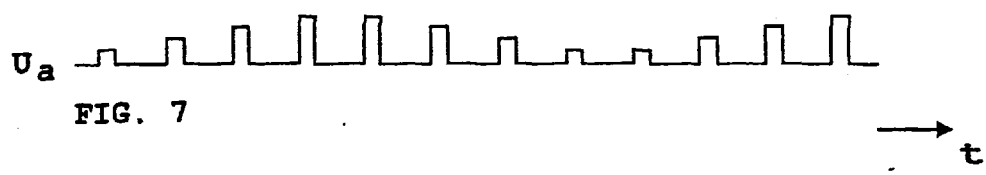
FIG. 7 shows an output signal $U_a$ of the synchronous demodulator of FIG. 2.

At the output of summer 15, synchronous demodulator 7 then delivers output signal $U_a$ depicted in FIG. 7. A subsequent averaging of output signal $U_a$ by lowpass filtration (not depicted) results directly in the rotation rate signal in the baseband that is proportional to the amplitude of the signal previously modulated with $f_{HF}$ and $f_z$.

Operation of the exemplary method according to the present invention described above involves the PLL 4 establishing a temporally fixed phase relationship between frequencies $f_z$ and $f_{HF}$.

In order to generate, using a PLL, an output signal of frequency $f_{HF}$ at $2^n$ times the frequency of the input signal of frequency $f_z$, a voltage-controlled oscillator (VCO) that oscillates at $2^n$ times the frequency of the input signal is used. A subsequent frequency division by a factor of $\frac{1}{2}^n$ allows the system to continue processing the resulting signal in the PLL. It is assumed that n=1, 2, 3, etc.; in particular, n may be at least 2.

With an exemplary embodiment of a single synchronous demodulator 7 according to the present invention as shown in FIG. 2 and with an exemplary method according to the present invention, demodulation of the doubly modulated signal may thus be accomplished on one step directly in the baseband.

The list of reference characters is as follows:
1 Synchronous demodulation apparatus
2 Rotation rate sensor
$f_z$ Natural resonant frequency of rotation rate sensor
4 Phase-locked loop, PLL
$f_a$ Sampling frequency of rotation rate signal
$f_{HF}$ Modulation frequency
5 C/U converter
$+U_e$, $-U_e$ Output signal of C/U converter
7 Synchronous demodulator
9 Logic circuit
Φ1 Control signal
Φ2 Control signal
11 Switch
12 Switch
13 Switch
14 Switch
15 Summer
$U_a$ Output signal of synchronous demodulation apparatus

What is claimed is:
1. A method to synchronously demodulate a multiply modulated rotation rate signal of a rotation rate sensor having a spring-mass system that oscillates at its natural resonant frequency and at least one capacitor to ascertain a rotation rate of a Coriolis effect acting on the spring-mass system, the method comprising:

generating a time-variable first electrical signal so that it exhibits a time-invariant phase relationship to the natural resonant frequency of the rotation rate sensor;

superimposing a second electrical signal, at the natural resonant frequency of the rotation rate sensor, on the first electrical signal to provide a multiply modulated electrical signal, an amplitude of the second electrical signal of a time-variable capacitance change of the at least one capacitor being correspondingly modulated; and ascertaining the time-variable capacitance change associated with the rotation rate and ascertaining the rotation rate by multiply demodulating a multiply modulated electric signal:

wherein:
the at least one capacitor includes two stationary capacitor electrodes and a capacitor electrode that is movable as a consequence of the action of the rotation rate;
the capacitor electrode is movable toward a first one of the two stationary capacitor electrodes and simultaneously movable away from a second one of the two stationary capacitor electrodes, the moving of the capacitor electrode bringing about two time-variable and mutually inverse capacitance changes;
the second electrical signal superimposed on the first electrical signal is modulated in accordance with the two time-variable and mutually inverse capacitance changes; and
the multiply modulated electrical signal is conveyed to a capacitance/voltage converter that delivers two mutually inverse time-variable voltage signals;
wherein in a first step, a first mutually inverse time-variable voltage signal is conveyed to a first input of a summer under a control of a first control signal, and a second mutually inverse time-variable voltage signal is conveyed to a second input of the summer under the control of the first control signal.

2. The method of claim 1, wherein the first electrical signal is generated so that a frequency of the first signal corresponds to $2^n$ times the natural resonant frequency, where n is a positive integer.

3. The method of claim 1, wherein the at least one capacitor includes a first stationary capacitor electrode and a second capacitor moved with respect to the first capacitor electrode as a consequence of an action of the rotation rate, as a result of which a capacitance changes.

4. The method of claim 3, wherein the multiply modulated electrical signal is conveyed to a capacitance/voltage converter that delivers a time-variable voltage signal based on an amplitude modulation of the second electrical signal brought about by the time-variable capacitance of the at least one capacitor.

5. The method of claim 1, wherein in a second step, the first mutually inverse time-variable voltage signal is conveyed to the second input of the summer under the control of a second control signal, and the second mutually inverse time-variable voltage signal is conveyed to the first input of the summer under the control of the second control signal.

6. The method of claim 5, wherein the second control signal is a switch-on signal during a time period during which the first mutually inverse time-variable voltage signal exhibits a positive voltage pulse.

7. The method of claim 5, wherein the first control signal one of opens and closes two first electronic switches, and the second control signal one of opens and closes two second electronic switches.

8. The method of claim 5, wherein the first control signal and the second control signal are generated by a logic circuit to which the first electrical signal, the second electrical signal, and the two mutually inverse time-variable voltage signals are conveyed.

9. The method of claim 5, wherein the first control signal, the second control signal and the mutually inverse voltage signals are conveyed to a synchronous demodulator that includes a summer and four electronic switches controlled by the first and second control signals, the summer delivering one of a rotation rate signal reproducing the rotation rate of the rotation rate sensor and a precursor stage of the rotation rate signal.

10. The method of claim 1, wherein the first control signal is a switch-on signal during a time period during which the second mutually inverse time-variable voltage signal exhibits a positive voltage pulse.

11. The method of claim 1, wherein the first electrical signal is generated by a phase lock loop (PLL) based on the natural resonant frequency of the rotation rate sensor.

12. The method of claim 11, wherein the PLL includes a voltage controlled oscillator to generate the first electrical signal.

13. The method of claim 1, wherein the capacitance/voltage converter is a charge amplifier having switched capacitor technology.

14. An apparatus to synchronously demodulate a multiply modulated rotation rate signal of a rotation rate sensor, the apparatus comprising:

a spring-mass system that oscillates at its natural resonant frequency; and at least one capacitor to ascertain a rotation rate of a Coriolis effect acting on the spring-mass system;

a generating arrangement to generate a time-variable first electrical signal so that it exhibits a time-invariant phase relationship to the natural resonant frequency of the rotation rate sensor;

a superimposing arrangement to superimpose a second electrical signal, at the natural resonant frequency of the rotation rate sensor, on the first electrical signal to provide a multiply modulated electrical signal, an amplitude of the second electrical signal of a time-variable capacitance change of the at least one capacitor being correspondingly modulated; and an ascertaining arrangement to ascertain the time-variable capacitance change associated with the rotation rate and ascertaining the rotation rate by multiply demodulating a multiply modulated electric signal;

wherein:
the at least one capacitor includes two stationary capacitor electrodes and a capacitor electrode that is movable as a consequence of the action of the rotation rate;
the capacitor electrode is movable toward a first one of the two stationary capacitor electrodes and simultaneously movable away from a second one of the two stationary capacitor electrodes, the moving of the capacitor electrode bringing about two time-variable and mutually inverse capacitance changes;
the second electrical signal superimposed on the first electrical signal is modulated in accordance with the two time-variable and mutually inverse capacitance changes; and
the multiply modulated electrical signal is conveyed to a capacitance/voltage converter that delivers two mutually inverse time-variable voltage signals;
wherein a first mutually inverse time-variable voltage signal is conveyed to a first input of a summer under a control of a first control signal, and a second mutually inverse time-variable voltage signal is conveyed to a second input of the summer under the control of the first control signal.

15. The apparatus of claim 14, further comprising:
a capacitance/voltage converter to deliver at least one time-variable voltage signal;
a PLL to generate at least one electrical signal based on the natural resonant frequency of the rotation rate sensor;
a logic circuit to generate at least one control signal; and
a synchronous demodulator to demodulate the multiply modulated rotation rate signal.

16. The apparatus of claim 14, wherein the capacitance/voltage converter is a charge amplifier having switched capacitor technology.

17. The apparatus of claim 14, wherein the first mutually inverse time-variable voltage signal is conveyed to the second input of the summer under the control of a second control signal, and the second mutually inverse time-variable voltage signal is conveyed to the first input of the summer under the control of the second control signal.

18. The apparatus of claim 17, wherein the second control signal is a switch-on signal during a time period during which the first mutually inverse time-variable voltage signal exhibits a positive voltage pulse.

19. The apparatus of claim 17, wherein the first control signal one of opens and closes two first electronic switches, and the second control signal one of opens and closes two second electronic switches.

20. The apparatus of claim 17, wherein the first control signal and the second control signal are generated by a logic circuit to which the first electrical signal, the second electrical signal, and the two mutually inverse time-variable voltage signals are conveyed.

21. The apparatus of claim 17, wherein the first control signal, the second control signal and the mutually inverse voltage signals are conveyed to a synchronous demodulator that includes a summer and four electronic switches controlled by the first and second control signals, the summer delivering one of a rotation rate signal reproducing the rotation rate of the rotation rate sensor and a precursor stage of the rotation rate signal.

22. The apparatus of claim 14, wherein the first control signal is a switch-on signal during a time period during which the second mutually inverse time-variable voltage signal exhibits a positive voltage pulse.

23. The apparatus of claim 14, wherein the first electrical signal is generated by a phase lock loop (PLL) based on the natural resonant frequency of the rotation rate sensor.

24. The apparatus of claim 17, wherein the capacitance/voltage converter is a charge amplifier having switched capacitor technology.

* * * * *